United States Patent [19]

Geiger

[11] 3,928,787

[45] Dec. 23, 1975

[54] ENERGY STABILIZATION IN A HORIZONTAL DEFLECTION CIRCUIT FOR A TELEVISION RECEIVER

[75] Inventor: Erich Geiger, Friesen, Germany

[73] Assignee: Loewe-Opta GmbH, Kronach, Germany

[22] Filed: Nov. 9, 1973

[21] Appl. No.: 414,389

[30] Foreign Application Priority Data

Nov. 11, 1972 Germany ............................ 2255389

[52] U.S. Cl. ................................. 315/403; 315/379

[51] Int. Cl.[2] .......................................... H01J 29/70

[58] Field of Search ............. 315/28, 29, 24, 27 TD, 315/27 R, 18, 379, 403, 411

[56] References Cited

UNITED STATES PATENTS

| | | | |
|---|---|---|---|
| 3,689,797 | 9/1972 | Hetterscheid et al. | 315/27 TD |
| 3,767,960 | 10/1973 | Ahrens | 315/27 TD |

*Primary Examiner*—Maynard R. Wilbur
*Assistant Examiner*—J. M. Potenza

[57] ABSTRACT

A thyratron-like gating device governs the current supplied to an inductance in energy-exchanging relation with the storage capacitor in a reactive horizontal sweep circuit. The gating device is triggered by a control pulse that is delayed with respect to the start of the flyback portion of the sweep cycle by an amount proportional to the magnitude of the voltage stored on the capacitor at the start of flyback. The control pulse is generated upon the coincidence of a first saw-tooth voltage triggered at the start of flyback and a second voltage derived from the magnitude of the pulse generated in a secondary winding of the deflection transformer at the start of flyback. Suitable gain control facilities limit the magnitude of the second voltage to a value that assures generation of the control pulse within the flyback interval.

6 Claims, 6 Drawing Figures

ENERGY STABILIZATION IN A HORIZONTAL DEFLECTION CIRCUIT FOR A TELEVISION RECEIVER

BACKGROUND OF THE INVENTION

Triggered reactive-type deflection circuits are frequently employed to effect the horizontal sweep portion of a television raster. The deflection circuit operates into the primary winding of a deflection transformer, one secondary winding of which may be coupled to the horizontal deflection plates of the picture tube.

The deflection circuit commonly includes a storage capacitor connected in oscillatory energy-exchanging relation with an input supply inductance, which in turn is coupled to a source of operating voltage. A pair of normally unoperated switching devices (typically thyristors) are connected on the output and input sides, respectively, of the capacitor. Such switching devices are separately triggerable to initiate the flyback and forward sweep portions, respectively, of the deflection circuit.

Certain deflection circuit arrangements of this type employ an additional secondary winding on the deflection transformer to trigger a regulating circuit that maintains a constant relation between dynamic deflection current changes (caused, e.g. by beam current variations in the picture tube) and the resulting changes in the voltage developed by the deflection circuit during the oscillations of energy between the operating voltage source and the deflection circuit load.

In one proposed arrangement of this type, facilities are provided for deriving, from a flyback pulse picked up by the additional secondary winding, a voltage proportional to the voltage on the storage capacitor at the start of the flyback interval. Such derived voltage is employed to vary the inductance of a regulating element coupled to the input of the deflection circuit. Such variation of the element inductance correspondingly varies the oscillatory energy exchange of the deflection circuit.

This type of control scheme has several main disadvantages. The -variable regulating element, besides being expensive to instrument, is bulky and occupies a large space in the television receiver. Moreover, this type of control scheme tends (except when operating at a particular load point such as maximum load current) to overcompensate for dynamic energy changes resulting in the application of an excess amount of correcting energy to the deflection circuit. Such excess is recycled between the capacitor in the deflection circuit and the power supply capacitor of the operating voltage source, and leads to relatively high power losses in the circuit.

SUMMARY OF THE INVENTION

The present invention provides an improved arrangement for stabilizing the energy conditions in a deflection circuit having a thyratron-like switch associated with an input storage inductance, while avoiding the above-mentioned disadvantages. In one embodiment, such thyratron-like switch (hereafter first gating device) is interposed in series between the operating voltage source and the input of the supply inductance. The first gating device is triggered at a point during the flyback interval determined by the magnitude of the flyback pulse picked off the additional secondary winding and thereby the voltage stored on the capacitor at the start of such flyback interval.

With this arrangement, the decrease in the amplitude of the flyback pulse which initially accompanies an increase in the deflection load current causes a triggering of the first gating device earlier in the flyback interval, thereby resulting in a higher current developed by the supply inductor at the end of the flyback interval. The energy increment represented by such developed current flow is transferred directly to the capacitor to increase the voltage stored thereacross during the succeeding forward sweep interval, thereby avoiding recycling losses, the necessity of "dumping" the excess energy stored in the input inductance, and the requirement of blocking diodes and similar circuitry. Since in this way the above-mentioned increase in load current effects a corresponding increase in the deflection circuit voltage, their ratio is maintained constant as desired.

A feature of the invention is the provision of facilities for converting variations in the amplitude of the flyback pulse to corresponding variations in the times of occurrence of the control pulses for the first gating device. An auxiliary saw-tooth voltage triggered at the start of the flyback interval is applied to one input of a comparator, e.g. a transistorized phase-shifting stage. To the other input of the comparator circuit is coupled a second voltage proportional to the amplitude of the flyback pulse. This second voltage is advantageously developed by a gain-controlled amplifier arranged so that the highest amplitude of the second voltage corresponds to the voltage level attained by the saw-tooth voltage at the end of the flyback interval.

Excitation of the saw-tooth generator, the comparator, and the gain-control amplifier may be accomplished over a common excitation path by either the second voltage or by a third voltage obtained from an additional auxiliary winding of the deflection transformer through a series diode. The presence of the second voltage disables such series diode to decouple the third voltage from the excitation path.

BRIEF DESCRIPTION OF THE DRAWING

The invention will be further set forth in the following detailed description taken in conjunction with the appended drawing, in which.

DETAILED DESCRIPTION

Figure 1:
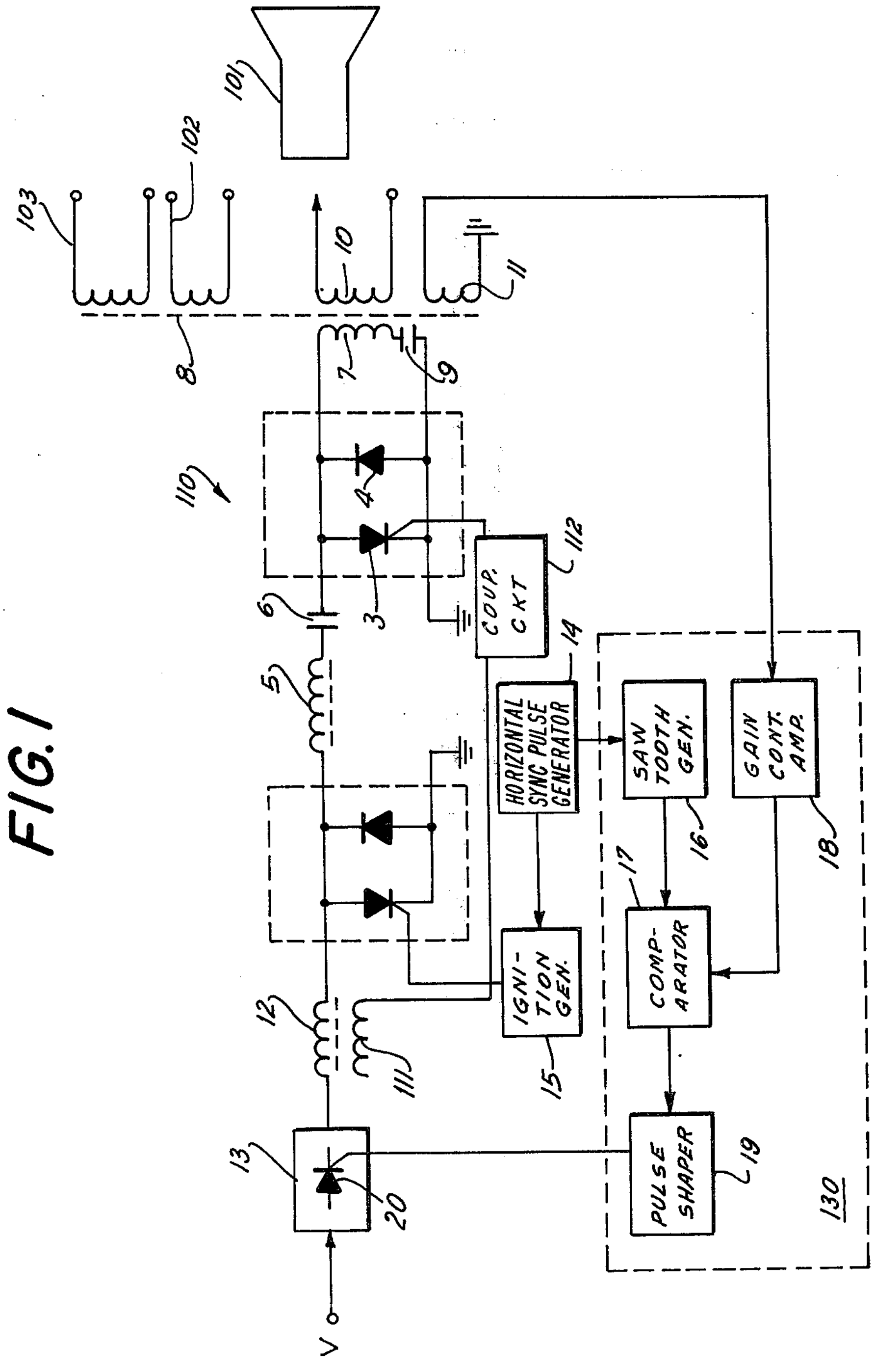
FIG. 1 is a combined block and schematic diagram of a regulated deflection circuit employing a thyratron-like gating device in accordance with the invention.

Referring now to FIG. 1 of the drawing, there is pictorially represented a portion of a TV receiver including a picture tube 101. Several of the required operating voltages of the tube 101 and of the remainder of the receiver are supplied conventionally via a plurality of secondary windings of a transformer 8. Such windings include, e.g. a winding 10 for applying high voltage to the tube 101, a second winding 102 for exciting the horizontal deflection plates of the tube 101, and a third winding 103 for supplying filament current to the tube 101.

A primary winding 7 of the transformer 8 is driven by a triggered, substantially reactive horizontal deflection circuit 110. The circuit 110 establishes the horizontal portion of the television raster by generating a repetitive sweep voltage for application to the horizontal plates of the tube 101 via winding 102. Each cycle of such sweep voltage has a relatively short flyback portion starting at time $T_0$ (FIG. 2*a*) and a relatively long forward sweep portion starting at time $T_3$.

The circuit 110 includes a main storage capacitor 6 coupled at its output to the primary winding 7, which is returned to ground via a capacitor 9. The storage capacitor 6 is coupled at its input to a main supply inductance 12 via a coil 5. The storage inductance 12 is coupled to a source of operating voltage $V_B$ as described below.

The transconductive path of a first switching thyristor 3 is coupled between the output of capacitor 6 and ground, and is shunted by a diode 4 of opposite polarity. The transconductive path of a second switching thyristor 1 is coupled between the junction of inductors 5 and 12 and ground, and is likewise shunted by a diode 2 of opposite polarity.

The thyristor 1 is triggered at the time $T_0$ of each sweep cycle to initiate the flyback interval. For this purpose, a suitable ignition generator 15 synchronized by a conventional horizontal sync pulse generator 14 is coupled to the control electrode of the thyristor 1. The generator 15 may be embodied by the horizontal oscillator 15 described, e.g., in U.S. Pat. No. 3,767,960 issued to P. R. Ahrens on Oct. 23, 1973.

The thyristor 3 is triggered at the instant $T_3$ in each sweep cycle to terminate such flyback portion and initiate the forward sweep portion. This is accomplished by coupling an auxiliary winding 111 of the supply inductance 12 to the control electrode of the thyristor 3 over a coupling circuit 112.

In order to stabilize the load conditions of the circuit 110 in the presence of dynamic variations of load energy (e.g., via beam current variations in the tube 101), the deflection circuit is provided with facilities for maintaining the ratio of the dynamic load current variation to the variation in voltage developed by the deflection circuit at a sensibly constant value, e.g. 0.5. Such facilities include an additional secondary winding 11 of the transformer 8 designed to pick off, at the time $T_0$ representing the start of the flyback interval, a pulse developed by the transformer 8 in response to the discharge current of the storage capacitor 6 through the now-triggered thyristor switch 1. Such discharge current is depicted as curve 121 in FIG. 2*a*. The amplitude of the pulse developed by the winding 11 is proportional to the voltage stored across the capacitor 6 at the time $T_0$; the capacitor voltage curve is represented as curve 122 in FIG. 2*a*.

In accordance with the invention, such regulating facilities for the deflection circuit 110 further include a gating device 13 including a thyratron-like switch 20 (illustratively a thyristor) as its active element. The thyristor 20 is triggered, as indicated below, only during the flyback interval $T_0 - T_3$. The time of occurrence $T_X$ of the triggering instant relative to the time $T_0$ is made proportional to the amplitude of the flyback pulse picked off the auxiliary winding 11. (The relative times of occurrence of typical pulses for triggering the thyristor 20 and the flyback-initiating thyristor 1, respectively, are depicted in FIGS. 2*b* and 2*c*.)

The triggering of the thyristor 20 serves to couple the operating voltage $V_B$ to the inductance 12 for the remaining portion $(T_X - T_3)$ of the flyback interval. During the portion $T_X - T_3$, the energy supplied to the deflection circuit is determined in accordance with the following current developed in the inductor 12:

$$i_{LS} = K \int_{T_X}^{T_3} V_B \, dt,$$

where $i_{LS}$ is the inductor current (represented as curve 123 in FIG. 2*a*), and K is a constant related to the inductance of the inductor 12.

Figure 2A:
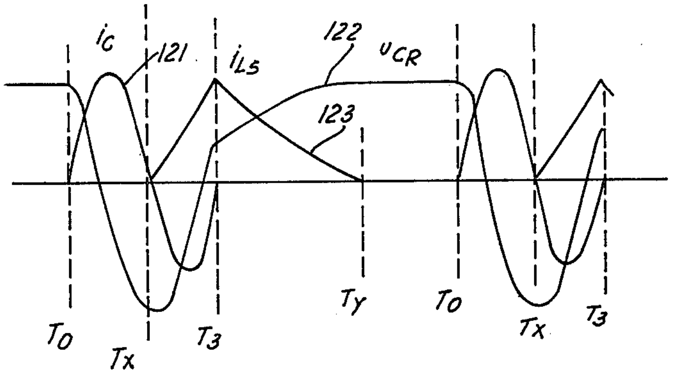
FIG. 2*a* is a composite graph showing several voltage and current wave forms in the arrangement of FIG. 1.
Figure 2B:
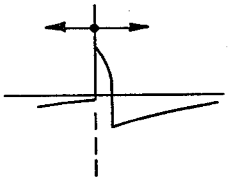
FIG. 2*b* and 2*c* are relative plots of the times of occurrence of trigger pulses respectively generated at the moment of triggering and at the start of the flyback interval of the gating device of FIG. 1.
Figure 2C:
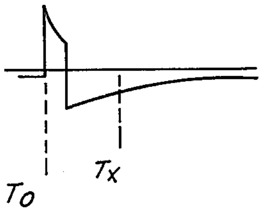
Figure 2D:
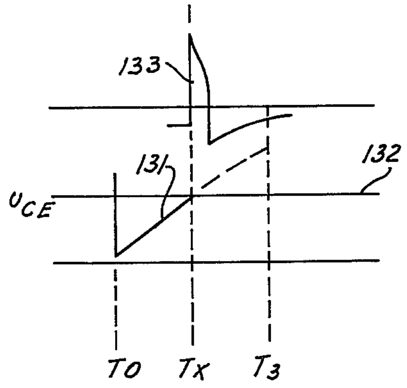
FIG. 2*d* is a composite graph representing the production, by the arrangement of FIG. 1, of a thyratron control pulse at a given time during the flyback interval.

As indicated further in FIG. 2*a*, the energy increment represented by the inductor current $i_{LS}$ is transferred to the storage capacitance 6 during the portion $T_3$–$T_Y$ of the next succeeding forward sweep interval. Such transferred energy is represented by a corresponding increment of the voltage stored across the capacitor 6. Such voltage increment, in turn, leads to a corresponding increment in the amplitude of the flyback pulse picked off winding 11 at the start of the next succeeding flyback interval.

As a result of this sequence of operations, an instantaneous increase in the power extracted by the load on the deflection circuit (represented e.g. by an increase in beam current of the tube 101) will initially cause a drop in the power consumed by the deflection circuit itself and thereby a corresponding reduction in the voltage stored in the capacitor 6. The instant regulating arrangement for the deflection circuit responds to the resulting reduction in the amplitude of the next flyback pulse developed by the winding 11 to advance the time $T_X$ of triggering of the thyristor 20 so that the latter conducts for a longer portion of the flyback interval. This causes an increase in the current through the inductance 12 at the time $T_3$. The increase in energy applied to the deflection circuit represented by such increased current is thereafter directly transferred, during the next interval $T_3 - T_Y$, to the storage capacitor 6 as an increase in its stored voltage. Thus, the assumed increase in load current is effective to cause a corresponding voltage increase in the deflection circuit so that the ratio of the current change to the voltage change remains sensibly constant.

It will be appreciated that a corresponding effect will be obtained when the energy balance between the deflection circuit and the load is disturbed for any other reason, e.g. a decrease in load energy consumption (leading to a retardation of the triggering time $T_X$), or a change in the level of the operating voltage $V_B$. In all such cases, the energy unbalance is exactly compensated without the lossy recycling of energy typical of the priorly proposed arrangements.

One suitable arrangement for converting the amplitude of the flyback pulses from the winding 11 into suitably timed control pulses for the thyristor 20 is indicated at 130 in FIG. 1. The horizontal oscillator 14 triggers, in synchronism with the ignition generator 15, a sawtooth generator 16 which provides a first linearly increasing voltage [represented by curve 131 in FIG.

2$d$ ]. The output of the sawtooth genertor 16 is coupled to a first input of a comparator 17. A second voltage [represented by a level 132 in FIG. 2$d$], proportional to the amplitude of the preceding flyback pulse on winding 11, is coupled via a gain-controlled amplifier 18 to a second input of the comparator 17. As represented in FIG. 2$d$, the comparator exhibits an output pulse 133 at the instant $T_X$ that the first sawtooth voltage reaches the level of the second voltage. Such output pulse is suitably shaped if desired in a pulse shaper 19 and is then applied to the control electrode of the thyristor 20.

In order to assure triggering of the thyristor 20 via the comparator 17 during the flyback interval $T_0 - T_3$, the controlled amplifier 18 is provided with facilities for limiting the maximum value of the second voltage to a value corresponding to the voltage level of the first sawtooth wave from the generator 16 at the time $T_3$.

Figure 3:
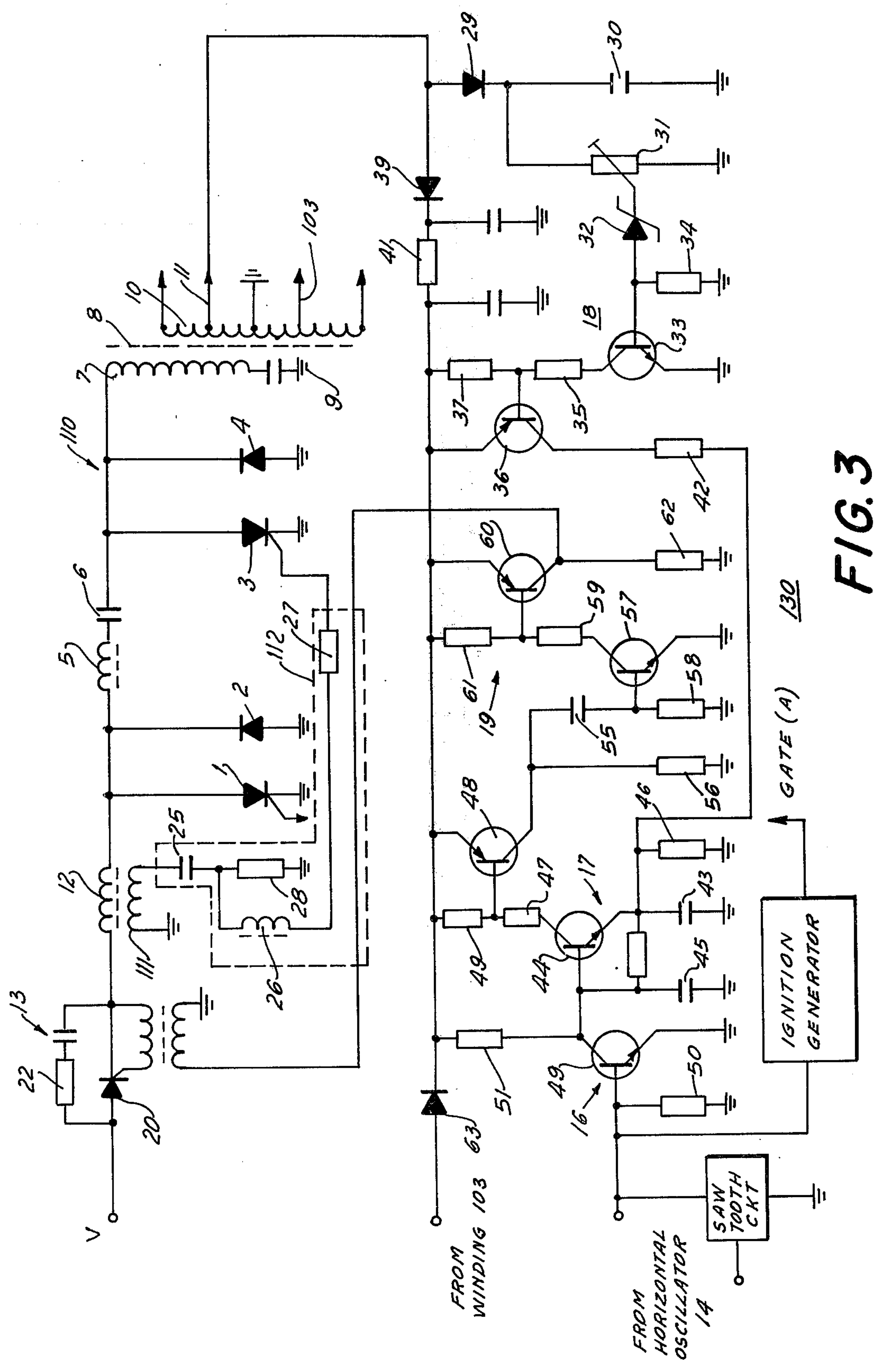
FIG. 3 is a detailed schematic diagram of the circuit of FIG. 1.

The converting arrangement 130, together with facilities for triggering the other thyristors 1 and 3 in the deflection circuit 110, are shown in more detail in FIG. 3. The gain-controlled amplifier 18 includes an input switching transistor 33 and an output coupling transistor 36; the latter is effective when conductive to effect the application of the second voltage to the second input of the comparator 17. In particular, the output of the winding 11 is rectified via diodes 29 and 39 and individually stored across capacitors 30 and 38, the latter via capacitor 40 and resistor 41. The output of the capacitor 38 is coupled via resistor 37 to the base of the transistor 36. The output of a voltage divider 31, whose input is coupled across capacitor 30, is coupled via Zener diode 32 to the base of switching transistor 33. The conduction condition of the transistor 33 is established, e.g. when the voltage across the capacitor 30 is in a prescribed range relative to the stabilized voltage level of the Zener diode.

The output of transistor 33 is coupled via resistor 35 to the base of transistor 36, which is triggered on when the switching transistor 33 is conductive to establish the second voltage level across a capacitor 43. By suitably selecting the voltage level at the voltage divider 31, such second voltage may be maintained within the range necessary to assure triggering of the thyristor 20 within the flyback interval as indicated before.

The comparator 17 is embodied as a phase shifter having a transistor 44. A capacitor 45 is connected from the base of transistor 44 to ground to establish the first comparator input. The above-mentioned capacitor 43, which stores the second voltage level, is connected from the emitter of transistor 44 to ground. The output of the sawtooth generator 16, whose active element is a transistor 49 and which otherwise is provided with conventional R-C and flyback circuitry, is coupled across the capacitor 45. The output of the transistor 44 is coupled to the control electrode of the thyristor 20 via pulse shaper 19 (including stages 48, 57 and 60) and a transformer 21.

Excitation of the sawtooth generator 16, the comparator circuit 17, the pulse shaper 19 and the gain-controlled amplifier 18 is provided over two separate paths: The winding 103 of the transformer 8 via a diode 63, and the portion of the rectified flyback pulse voltage developed across capacitor 38. This latter voltage serves, when present, to diasble the diode 63, so that only one of the two excitation paths is active at any given time.

In the foregoing, the invention has been described in connection with a preferred arrangement thereof. Many variations and modifications will now occur to those skilled in the art. It is accordingly desired that the scope of the appended claims not be limited to the specific disclosure herein contained.

What is claimed is:

1. In a deflection circuit having a repetitive sweep cycle including a first relatively short flyback interval and a second relatively long forward sweep interval wherein the circuit comprises, in combination, a first storage capacitor coupled between a supply inductor and the primary winding of a deflection transformer, first means for coupling the input of the inductor to a source of operating voltage whereby an oscillatory energy interchange occurs between the operating voltage source and the output of the deflection circuit via the inductance and the first storage capacitor, and a first thyratron-like gating means associated with the inductor, the switching time of the first gating means being varied in dependence on changes in the quantity of energy in such oscillatory energy interchange, the improvement wherein the first gating means is serially connected between the source of operating voltage and the input of the inductor, and wherein the circuit further comprises, in combination, first means for generating, during each first interval, an output control pulse of substantially fixed duration whose time of occurrence relative to the start of the associated first interval is proportional to the voltage stored on the first capacitor at the start of such first interval, and second means for coupling the output of the first generating means to the control electrode of the first gating means, whereby the time of occurrence of the output control pulse is automatically adjusted to maintain a constant dynamic current-voltage ratio at the output of the deflection transformer.

2. A circuit as defined in claim 1, in which the first generating means comprises, in combination, comparator means having first and second inputs and an output adapted to exhibit a pulse upon a coincidence of voltage amplitudes applied to the first and second inputs, second means triggered at the start of the first interval for generating a first sawtooth voltage whose magnitude reaches a first value at the conclusion of the first interval, third means for generating a second voltage proportional to the magnitude of the voltage stored on the first capacitor at the start of the first interval, third means for coupling the output of the second generating means to the first input of the comparator means, and fourth means for coupling the output of the third generating means to the second input of the comparator means.

3. A circuit as defined in claim 2, in which the third generating means further comprises, in combination, a first secondary winding of the deflection transformer, and means for rectifying the output of the first secondary winding.

4. A circuit as defined in claim 2, in which the third generating means further comprises gain control means for limiting the maximum value of the second voltage to the first value.

5. A circuit as defined in claim 3, in which the third generating means comprises, in combination, second and third gating means, second and third capacitors, means for coupling the output of the rectifying means across the second and third capacitors, respectively, means for producing a third voltage proportional to the difference between the voltage across the second capacitor and a reference value, fifth means for coupling the third voltage to the control electrode of the second gating means so that such second gating means conducts when the third voltage is within a prescribed range, sixth means for coupling the voltage across the third capacitor to the control electrode of the third gating means, and seventh means for coupling the output of the second gating means to the control electrode of the third gating means, the third gating means being made conductive upon the conduction of the second gating means.

6. A circuit as defined in claim 5, in which the deflection transformer includes a second secondary winding, and in which the circuit further comprises, in combination, a common terminal for exciting the second and third generating means, a diode for coupling the second secondary winding to one terminal of the diode, eighth means for coupling the other terminal of the diode to the common terminal, and ninth means for coupling the third capacitor to the common terminal, the diode being rendered non-conductive to decouple the second secondary winding from the common terminal in the presence of voltage across the third capacitor.

* * * * *